Patented Oct. 22, 1940

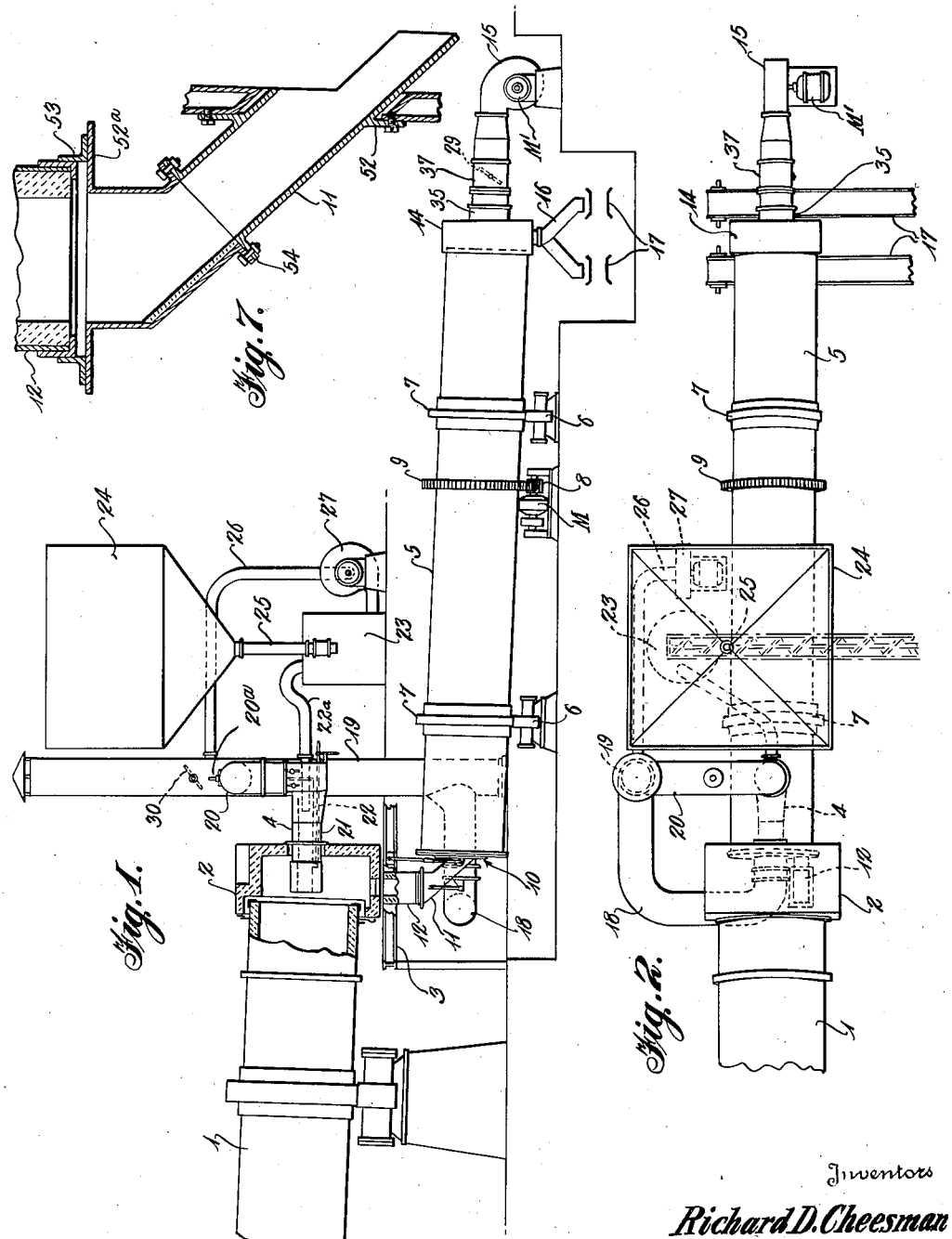

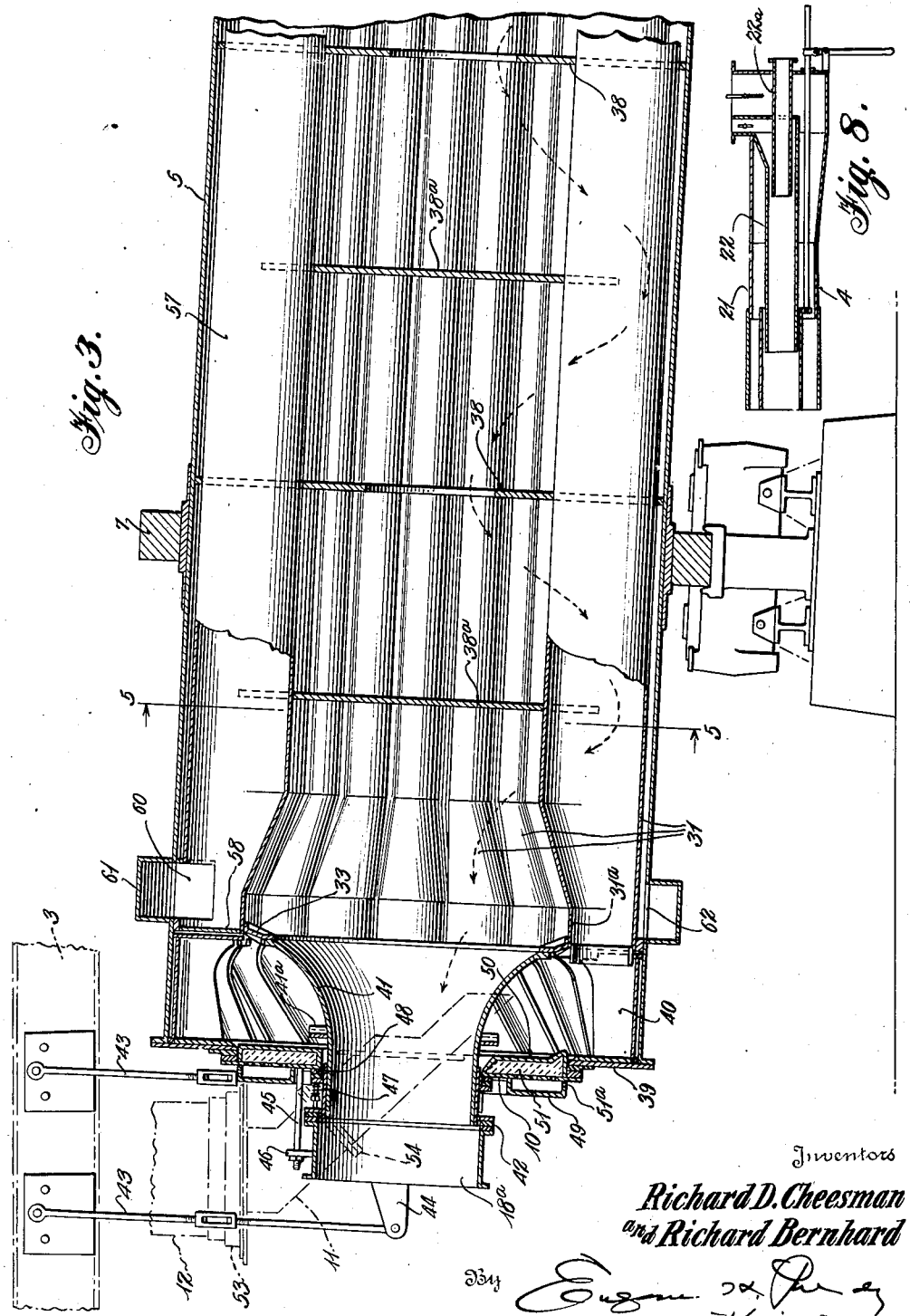

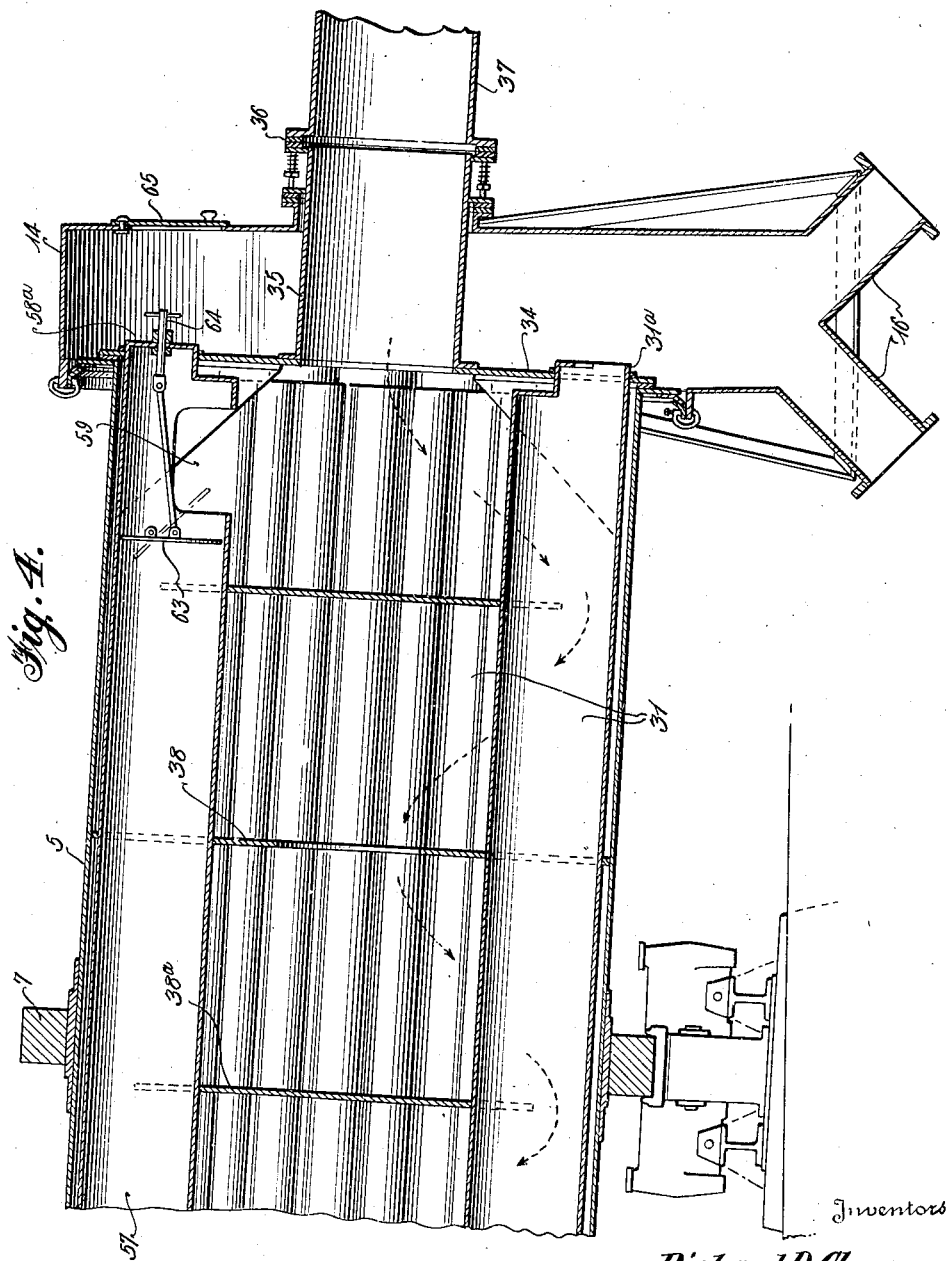

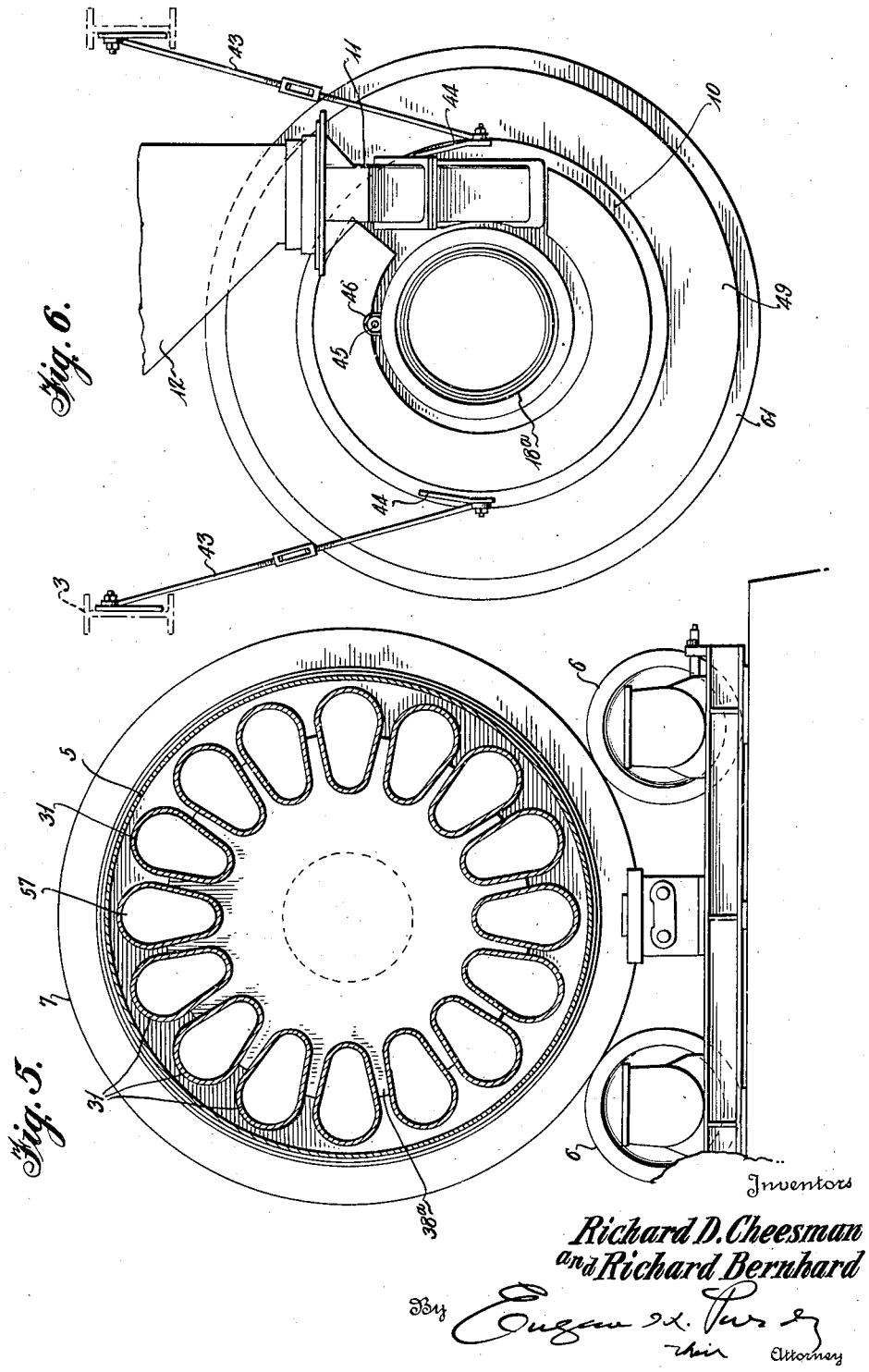

2,218,873

UNITED STATES PATENT OFFICE 2,218,873

TUBE COOLER

Richard D. Cheesman and Richard Bernhard, Allentown, Pa., assignors to Traylor Engineering & Manufacturing Company, a corporation of Delaware Application October 12, 1939, Serial No. 299,204

14 Claims. (Cl. 263—32)

This invention relates to rotary coolers of the general type used in conjunction with rotary kilns for cooling calcined material following its discharge from the kiln.

More especially, in the production of cement clinker during a stage of the manufacture of Portland cement, it is not unusual to pass the hot clinker issuing from the kiln through an inclined rotating cooling drum counter-current to a stream of cooling air which air is subsequently delivered to the kiln to support combustion of the burner flame therein. This fresh air ordinarily enters the cooling drum at its lower or discharge end and in flowing through the drum in direct contact with the clinker becomes highly heated and thereby especially suited for use as the secondary air of combustion for the burner flame. By "secondary air" is meant the relatively large volume of air required to support combustion of the fuel—for example, pulverized coal—injected into the kiln through the burner pipe, in addition to the air under compression for blowing the fuel through the burner pipe into the kiln.

Such mode of cooling cement clinker in which the cooling air is brought directly into contact with the hot clinker is open to several objections. For example, during the flow of the air through the cooling drum the dust generated by the agitation of the clinker within the rotating drum is swept over into the kiln with a consequent clouding or fogging of the atmosphere within the kiln. While the presence of small quantities of dust in the atmosphere of the kiln has been found to be beneficial because of its effect of increasing the luminosity and hence the heating efficiency of the burner flame, ordinarily sufficient dust for this purpose is supplied by the agitation of the clinker within the rotating kiln and the excess dust introduced into the kiln by the cooling air serves no useful purpose. On the contrary, the reburning of such clinker dust lowers the heating efficiency of the kiln.

Furthermore, this dust frequently clouds the atmosphere of the kiln to such an extent as to make it difficult for the operator in charge of the kiln to observe conditions within the kiln—by peering through a port provided for such purpose—and thus to take timely action to correct faulty conditions when they are found to exist. For example, under improper action of the burner flame a ring formed of accumulating deposits of hot material builds up on the interior of the kiln in the neighborhood of the flame until it seriously obstructs the travel of the clinker along the kiln. To remove such a ring, it is necessary to place the kiln out of service for an extended period of time until the latter has cooled sufficiently to allow workmen to break away the hard, vitreous material composing the ring and often to renew damaged sections of the fire-brick lining of the kiln.

The formation of such rings may be avoided, or in any event greatly retarded, by carefully supervising conditions within the kiln during its operation, and in order to do this it is necessary that the atmosphere of the kiln be sufficiently clear to permit observation of the performance of the burner flame therein.

It is an important object of this invention to provide, in combination with a kiln, a rotary cooler through which both the primary and the secondary air of combustion for the burner flame passes from the outside atmosphere into the kiln, moving in heat-transfer relation, but out of direct contact, with the hot clinker traveling through the cooler, so that the air enters the kiln highly heated but substantially free from dust.

More particularly the invention contemplates the provision of a cooler of the rotary drum type in which the clinker issuing from the kiln is passed through a series of thin-walled muffle tubes extending longitudinally within and rotatable with the cooling drum, and in which the air flows through the cooling drum counter-current to the travel of the clinker, impinging at high velocity against the tubes in a direction approximately normal thereto and abstracting heat from the clinker through the thin metal walls of the tubes. In this way the clinker is efficiently cooled and the large volume of air is indirectly preheated by the clinker in such a manner that the entry of dust is avoided.

The invention has as another object to provide in a rotary cooler of the above character means for admitting cool air into the forward end of the cooler so as to prevent overheating the muffle tubes and other structural parts of the cooler which are most directly exposed to the high temperatures of the hot clinker coming from the kiln.

Another object of the invention is to provide a bell-shaped offtake duct for conducting the heated air from the cooler into the conduit leading to the kiln, the arrangement being such as to relieve stresses in the front tube sheet, which supports the inlet ends of the muffle tubes, due to expansion. In the preferred form of our invention, a shield is provided for obstructing the passage of clinker along the bell-shaped offtake duct to outside the cooler.

A further object of the invention is to provide in a rotary cooler of the above character means for supporting the cover at the forward end of the cooler so that it is gravitationally held in contact with the cooler to maintain a tight seal therewith but allowing expansion and contraction of the cooler.

As another object, the invention aims to provide in a kiln-cooler assembly of the character referred to above a pulverizing device for grinding coal into a size suitable for injection into the kiln by air pressure, and including means for utilizing a portion of the heated air passing out of the cooler for drying the coal. Drying the coal preparatory to its pulverization is desirable to insure the most effective grinding thereof and also to reduce the tendency of the fragments of coal to lump together.

Another object of the invention is to provide a means for cooling material of a nature which reacts with air or the humidity contained in the air to the detriment of the product. For example, lime at lower temperatures reacts with the moisture in the air to form calcium hydroxide which is undesirable when the recovery of pure lime (CaO), is desired. Likewise a material that has been reduced in a calcining operation may be cooled while maintaining the air out of contact with the material to avoid its oxidation.

Still another object of our invention is to provide in a cooler of the above character muffle tubes of improved form and construction for promoting the cooling of clinker or other material during its passage through such tubes.

Other objects and advantages will be apparent from the following detailed description of a preferred embodiment of the invention, reference being had to the annexed drawings in which:

Figure 1 is a schematic view in side elevation of a cooling drum associated with a rotary kiln for calcining material, certain parts being broken away for clearness;

Figure 2 is a plan view of the kiln and cooler assembly shown in Fig. 1;

Figure 3 is a longitudinal cross-sectional view of the forward or inlet end of the cooling drum;

Figure 4 is a longitudinal cross-sectional view of the rear or outlet end of the cooling drum;

Figure 5 is a transverse cross-sectional view of the cooling drum taken on the line 5—5 of Fig. 3;

Figure 6 is an external end-on view of the forward end of the cooling drum;

Figure 7 is a side view, in cross-section, of the feed spout for delivering clinker into the cooling drum; and Figure 8 is a schematic view in longitudinal cross-section of the burner employed with the kiln.

Referring to the drawings, and more particularly to Fig. 1, there is shown the discharge end of a rotary kiln 1 of the general type used for the manufacture of cement clinker in the Portland cement industry. This kiln is arranged for rotation about an inclined axis and its lower outlet end is closed by a hood 2 supported on a platform 3. Through the hood extends a burner 4 directed approximately axially of the kiln. An observation port (not shown) is suitably provided in the hood for viewing conditions within the kiln. Pulverized coal is delivered through the burner by air under pressure, which air also serves as the primary air of combustion, while a larger volume of air—from 60 to 80 per cent of the total air of combustion and known as the secondary air—is delivered through the burner as will later be more fully explained.

On the level below the platform 3 having its inlet end arranged approximately in vertical alignment with the outlet end of the kiln, is a rotary drum 5 for cooling the hot clinker discharged from the kiln. This cooling drum is floatingly supported at a slight inclination above the lower floor level upon rollers 6 located at spaced intervals intermediate the ends of the drum and engaging tires 7 encircling the drum. Rotation is imparted to the drum by a pinion 8, driven by a motor M and engaging a ring gear 9 extending about the circumference of the drum. The elevated forward end of the cooling drum is closed by a cover 10 through which extends, to one side of the axis of rotation of the drum, the lower end of a feed spout 11. This feed spout extends at an inclination and communicates at its upper end with a hopper 12 located below the hood 2 into which passes the hot clinker issuing from the kiln. The rear end of the cooling drum is closed by a housing 14 into which air is forced by a blower 15 driven by an electric motor M'. The cooled clinker leaving the cooling drum escapes through a branched outlet pipe 16 leading from the bottom of the housing 14 and discharges onto endless conveyors 17. The air leaving the cooler at its inlet end passes through a return-bend conduit 18 leading into the bottom of an enlarged upright riser pipe 19 which opens at its upper end to the outside atmosphere. The riser pipe is of such a size as to provide a plenum chamber for heated air. A short conduit section 20 directs the air from the riser pipe 19 into the burner, the flow being regulable by a valve 20a located in this conduit section.

The burner 4, as best indicated in Fig. 8, comprises an outer burner pipe 21 and an inner burner pipe 22 concentrically supported within the outer burner pipe so as to provide two discharge nozzles, one surrounding the other. The primary air for injecting pulverized coal into the kiln is discharged through the inner burner pipe 22, while the much larger volume of secondary air required to support combustion of the burner flame is supplied through the outer burner pipe 21. The short conduit section 20 communicates with both the inner burner pipe 22 and the outer burner pipe 21, while the inner burner pipe is extended by a pipe section 22a so as to pass through the top of a coal-pulverizing chamber 23. This chamber encloses a grinding mill (not shown) of any suitable kind for disintegrating the coal which feeds by gravity from an elevated storage bin 24 through a downspout 25 to a feeder, not shown.

The primary air for injecting the coal into the kiln through the inner burner pipe is taken from the riser pipe 19 by way of a conduit 26 leading into the bottom of the pulverizing chamber and including in its circuit a blower 27 for promoting the flow of air through the chamber. The heat supplied by this air serves to remove the moisture from the coal and thereby facilitate its grinding. A damper 29 is provided intermediate the blower 15 and the housing 14 adjacent the rear end of the cooling drum and a damper 30 is also provided in the riser pipe 19 above the point of connection of the conduit 26 therewith, these dampers serving to regulate the volume of air passing to the burner. Preferably these dampers will be automatically controlled in conformity with the pressure and temperature of the air in the system in a manner similar to that disclosed in the patent of Richard D. Cheesman, No. 2,160,956, granted June 6, 1939.

Coming now to a consideration of the cooler in more detail, reference is made to Figs. 3, 4 and 5. Extending longitudinally through the cooling drum 5 and arranged in spaced circular formation is a series of muffle tubes 31. These muffle tubes extend between and open through header plates 33 and 34 fastened to the inside of the drum. The front header plate 33 is located a spaced distance inwardly from the forward end of the drum and the muffle tubes have a welded connection therewith. The rear header plate 34 closes the outlet end of the drum and the ends of the muffle tubes are slidingly fitted therein to allow for expansion and contraction of the tubes.

The rear header plate 34 is centrally apertured to afford a comparatively large opening and surrounding this opening and extending axially outward from the header plate is a duct 35. This duct is bolted to the rear header plate and projects through the housing 14 to the outside thereof where it joins, through a slip connection 36, a stationary sleeve 37 fastened to the discharge side of blower 15.

Supported upon the inside of the cooling drum 5 and located at spaced intervals therealong are baffles 38 and companion baffles 38a. These baffles partially obstruct the space within the drum and cause the air flowing therethrough to take an undulated path, as indicated by the arrows in Figs. 3 and 4, crossing and recrossing the muffle tubes at a steep angle thereto and at high velocity which results in an efficient abstraction of heat through the walls of the tubes.

The extreme forward end of the cooling drum is partially closed by a flange plate 39 bolted or otherwise rigidly affixed to the drum, this flange plate centrally providing a relatively large opening which is closed by the cover 10. The space separating the flange plate from the front header plate 33 defines a compartment for receiving the incoming clinker delivered from the feed spout 11. Lifting blades 40 located within this compartment and appropriately positioned with respect to the inlet ends of the muffle tubes serve when the cooler is rotated to pick up the clinker from the bottom of the compartment and feed it into the tubes.

The front header plate 33 is centrally provided with a large opening to afford passage of the air out of the cooler, and surrounding this opening and rigidly fastened to the header plate is a bell-shaped offtake duct 41 projecting outwardly through an opening centrally provided in the cover 10. A shield 41a surrounds the offtake duct a spaced distance inwardly from the rear face of the cover, this shield serving to prevent the escape of clinker and clinker dust along the offtake duct to outside the cooler where this abrasive material might find its way between the bearing surfaces of the seals surrounding the offtake duct and thus cause rapid wear of the parts. The end of the offtake duct projecting beyond the cover 10 joins, through a slip connection 42, a stationary collar 18a forming part of the conduit system 18 leading to the riser pipe 19. Because the offtake duct is supported independently of the cover it is free to expand and contract without imposing any stress upon the cover.

The cover 10 closing the space between the flange plate 39 and the projecting end of the bell-shaped offtake duct 41 is hung by two pairs of adjustable suspension rods 43 (see Figs. 3 and 6) pivotally fastened at their upper ends to joists supporting the platform 3 and pivotally connected at their lower ends to a pair of horizontal arms 44 projecting outward upon diametrically opposite sides of the cover. The arrangement is such that the stationary cover is yieldingly held by gravity in engagement with the flange plate 39 which rotates with the cooling drum. The pressure of the cover against the flange plate is nominal but is sufficient to maintain a tight closure therebetween under all conditions of longitudinal expansion and contraction of the cooler. Pins 45 extending horizontally outward from the cover pass through openings in ears 46 on collar 18a so as to furnish a slidable support for the collar. Compression springs 47 interposed between the slip connection 42 and a sealing ring 48 on the cover normally bias the ring against the cover to close the clearance around the collar 18a where the latter projects through the cover.

A circular channel-shaped member 49 is welded to the outer face of the cover forming therewith an annular compartment. Upon the opposite—that is, the inner—face of the cover is bolted a hollow liner 50 filled with a refractory material 51, such as fireclay. The compartment 49 may be connected to a blower (not shown) for forcing fresh air thereinto which is allowed to escape from the compartment through circumferentially arranged vents 51a.

The feed spout 11 (see Figs. 6 and 7), as has already been stated, extends downwardly at an inclination and projects through the cover 10 into the compartment at the forward end of the cooling drum. This spout is provided intermediate its length with an external flange 52 by which the spout is bolted to the cover. The upper end of the spout terminates in an outwardly directed flange 52a that slidingly bears against a frame 53 made of angle iron surrounding the lower end of the hopper 12. The spout may be made sectional, as indicated by the bolted connection 54 (Fig. 7), to afford convenient disassembly of the apparatus.

The muffle tubes 31 are constructed of comparatively thin, heat-resistant metal and are of generally sector or pear shape in transverse cross-section, as best indicated in Fig. 5, with their narrowest dimension directed toward the axis of rotation of the cooling drum. This form of tube furnishes a large heat-conductive surface and contributes to the rapid cooling of the clinker. Each muffle tube is imperforate throughout its length and terminates at each end in a cylindrical stub section 31a which is offset axially from the tube in a manner such as to prevent clinker escaping from the tubes as the drum completes the half of its circle of rotation located above the axis of rotation of the drum. These stub sections pass through the header plates at opposite ends of the drum.

Additionally there is provided an air-pass tube 57, corresponding in general to a muffle tube but having its ends closed by caps 58 and 58a at its forward and rear ends respectively. Adjacent its rear end and inwardly of the rear header plate 34, a portion of the wall of the air-pass tube is cut away to form an inlet 59 which allows some of the fresh air entering the drum through the duct 35 to pass into and flow through the air-pass tube directly to the front end of the cooling drum. At the front end of the drum and inwardly of the front header plate 33, the air-pass tube is provided with an outlet 60 extending through the wall of the cooling drum. This outlet port communicates with a wind box 61 encircling the circumference of the drum. Openings 62 are cut through the wall of the drum so as to provide communication between the wind box and the interior of the drum at locations adjacent the forward ends of the muffle tubes and immediately behind the front header plate so that the fresh air entering the drum through these openings prevents overheating at the forward end of the drum such as might cause buckling of the header plate 33 and the muffle tubes 31. For regulating the flow of air through the air-pass tube, there is provided within this tube a butterfly valve 63 (Fig. 4) adapted to be actuated by a psh-rod 64 projecting through the cap 58a closing the end of the tube. A door 65 on the housing 14 affords access to the push-rod. In ordinary practice, it may be found desirable to include more than one air-pass tube in the cooler.

The operation of the apparatus just described is as follows: The hot clinker discharged from kiln 1 into the hood 2 drops down into the hopper 12 and thence passes through the inclined feed spout 11 into the closed compartment between the flange plate 39 and the front header plate 33 at the forward end of the cooling drum. The lifting vanes 40 upon the interior of this compartment scoop up the clinker upon rotation of the drum and upon continued movement direct it into the open inlet ends of the muffle tubes 31. During rotation of the cooling drum, the clinker, under the combined action of gravity and the agitation produced by rotation of the drum, travels downwardly through the muffle tubes toward their outlet ends.

The fresh air forced into the outlet end of the drum by the blower 15 flows through the drum contra to the direction of travel of the clinker in the tubes and is caused by the baffles 38 and 38a to take an indirect course through the drum weaving back and forth across the thin-walled muffle tubes at high velocity and at a steep angle so as to thereby insure the most efficient absorption of heat from the clinker in the tubes. The cooled clinker spills from the ends of the tubes into the housing 14 enclosing the outlet end of the drum and thence through the branched pipe 16 onto the spiral conveyors 17.

The air flowing through the cooling drum becomes highly heated by contact with the hot muffle tubes, and this air passes out of the drum through the bell-shaped duct 41 into the conduit 18. From the conduit 18 the air passes into the riser pipe 19 and thence through conduit section 20 into the burner 4. As has already been explained, a portion of the heated air is drawn off from the riser pipe 19 by blower 27 connected in circuit with the conduit 26 and is delivered into the coal pulverizing chamber 23 for drying the coal and conveying it through pipe section 22a into the burner 4.

The cool air admitted through the air-pass tube 57 to the forward end of the cooler, prevents an excessive rise in temperature at that end of the cooler such as might damage the tubes and other structure thereof. The volume of air flowing through the air-pass tube is controlled by the butterfly valve 63.

It will be understood from the above description that the invention provides a means for efficiently cooling hot material, such as cement clinker, following its discharge from a kiln without bringing the cooling air into direct contact with the material and for utilizing the resulting clean heated air as the air required to support combustion of the burner flame within the kiln. The result of this is that excessive clouding of the atmosphere within the kiln by dust returned from the cooler and heat losses resulting from the reburning of such returned dust are avoided. Thus, by observing the burner operation within the kiln through the port provided for that purpose, the operator is enabled to take proper steps to remedy faulty conditions within the kiln before they have proceeded too far for correction.

By the present invention the cooling of hot calcined material in muffle tubes swept by a current of cooling air is effectively accomplished and the difficulties attending such mode of cooling, resulting from the highly abrasive action of the material—for example, cement clinker—and the excessive expansion and contraction of the tubes which tend to break down their heat-transfer surfaces, have been overcome.

While the invention has been described in connection with the cooling of cement clinker, it is to be understood that it is not limited to such a specific application but will operate successfully with other calcined materials, such as lime, aluminum oxide, titanium oxide and phosphate rock.

The invention may be embodied in other specific forms without departing from the spirit or essential characteristics of the invention, and the present embodiment is therefore to be considered as illustrative and not restrictive, and all changes which come within the meaning and range of equivalency of the claims are therefore intended to be embraced therein.

We claim:

1. In combination with a rotary kiln, a burner for injecting fuel into the kiln to maintain a flame therein, a horizontal, rotatable cooling drum located adjacent the kiln, means for rotating the cooling drum, a series of muffle tubes extending longitudinally within the cooling drum, means for passing the hot material discharged from the kiln through the muffle tubes, means for moving air through the cooling drum externally of the muffle tubes and entirely out of contact with the material, and means for delivering the air from the cooling drum into the kiln to support combustion of the burner flame, said drum enclosing all of said muffle tubes and forming a common conduit for the air.

2. In combination with a rotary kiln, a burner for injecting fuel into the kiln to maintain a flame therein, a horizontal, rotatable cooling drum located adjacent the kiln, means for rotating the cooling drum, a series of muffle tubes extending longitudinally within the cooling drum, means for passing the hot material discharged from the kiln through the muffle tubes, means for moving air through the cooling drum externally of the muffle tubes and entirely out of contact with the material, a coal-pulverizing chamber adjacent the burner, and means for delivering air from the cooling drum through said coal-pulverizing chamber into the burner, said drum enclosing all of said muffle tubes and forming a common conduit for the air.

3. In combination with a rotary kiln, a burner for injecting fuel into the kiln to maintain a flame therein, a horizontal, rotatable cooling drum located adjacent the kiln, means for rotating the cooling drum, a series of muffle tubes extending longitudinally within the cooling drum, means for passing the hot material discharged from the kiln through the muffle tubes, means for moving air through the cooling drum externally of the muffle tubes and entirely out of contact with the material, a coal-pulverizing chamber adjacent the burner and means for delivering a portion of the air from the cooling drum into the kiln as secondary air of combustion of the burner flame and for delivering another portion of said air through the coal-pulverizing chamber into the burner as primary air of combustion of the burner flame.

4. A rotary cooler comprising an elongated horizontal cylindrical drum, means for rotating the drum, front and rear header plates closing the drum adjacent its ends, a series of muffle tubes extending longitudinally within the drum and opening through the header plates, means for introducing material into the muffle tubes at one end of the drum and means for flowing cold air through the drum intermediate the header plates for externally cooling the muffle tubes, said drum enclosing all of said muffle tubes and forming a common conduit for the air.

5. A rotary cooler comprising an elongated horizontal cylindrical drum, means for rotating the drum, front and rear header plates closing the drum adjacent its ends, a series of laterally spaced muffle tubes extending longitudinally within the drum and opening through the header plates, means for introducing material into the muffle tubes at one end of the drum and means for introducing cold air into the drum through one of the header plates adjacent one end of the drum and for removing air therefrom through the other header plate adjacent the opposite end of the drum, said drum enclosing all of said muffle tubes and forming a common conduit for the air.

6. A rotary cooler comprising an elongated cylindrical drum, means for rotating the drum, front and rear header plates closing the drum adjacent its ends, a series of muffle tubes extending longitudinally within the drum and opening through the header plates, means for introducing material into the muffle tubes at one end of the drum, means for circulating cold air through the drum and in heat-transfer relation to the muffle tubes and means for cooling the muffle tubes adjacent the front header plate, said drum enclosing all of said muffle tubes and forming a common conduit for the air.

7. A rotary cooler comprising an elongated horizontal cylindrical drum, means for rotating the drum, front and rear header plates closing the drum adjacent its ends, a series of muffle tubes extending longitudinally within the drum and opening through the header plates, means for introducing material into the muffle tubes at one end of the drum, means for introducing cold air into the drum through one of the header plates and for removing air therefrom through the other header plate, and an air-pass tube for conducting air from adjacent a less heated region of the drum to adjacent a more heated region of the drum, said drum enclosing all of said muffle tubes and forming a common conduit for the air.

8. A rotary cooler comprising an elongated horizontal cylindrical drum, means for rotating the drum, front and rear header plates closing the drum adjacent its ends, a series of muffle tubes extending longitudinally within the drum and opening through the header plates, means for introducing material into the muffle tubes at one end of the drum, a blower for introducing cold air into the drum through the rear header plate and for removing air therefrom through the front header plate, and an air-pass tube for conducting air from adjacent the rear header plate to adjacent the front header plate, said drum enclosing all of said muffle tubes and forming a common conduit for the air.

9. A rotary cooler comprising an elongated horizontal cylindrical drum, means for rotating the drum, front and rear header plates closing the drum adjacent its ends, a series of muffle tubes extending longitudinally within the drum and opening through the header plates, means for introducing material into the muffle tubes at one end of the drum, a blower for introducing cold air into the drum through the rear header plate, an air-pass tube for conducting air from adjacent the discharge end of the drum to adjacent the front header plate, and a valve in said air-pass tube for regulating the quantity of air passing therethrough, said drum enclosing all of said muffle tubes and forming a common conduit for the air.

10. A rotary cooler comprising an elongated horizontal cylindrical drum, means for rotating the drum, front and rear header plates closing the drum adjacent its ends, a series of circularly arranged muffle tubes extending longitudinally within the drum and opening through the header plates, means for introducing cold air into the drum through one of the header plates and for removing air therefrom through the other header plate, said drum enclosing all of said muffle tubes and forming a common conduit for the air, and baffle plates disposed transversely of the drum at spaced intervals intermediate its length for deflecting the air across the muffle tubes at high velocity and at approximately right angles thereto.

11. A rotary cooler comprising an elongated horizontal cylindrical drum, means for rotating the drum, front and rear header plates closing the drum adjacent its ends, the front header plate being located inwardly from the forward end of the drum, a cover closing the forward end of the drum so as to provide with the front header plate a material-receiving compartment, a feed spout for delivering material to be cooled into the compartment, elevating blades inside the compartment for directing the material into the inlet ends of the muffle tubes during rotation of the drum, a hood enclosing the discharge end of the drum for receiving material spilling from the muffle tubes, a conduit opening through the hood and rear header plate for introducing cold air into the drum and an offtake conduit opening through the front header plate and cover for removing said air from the drum, said drum enclosing all of said muffle tubes and forming a common conduit for the air.

12. A rotary cooler comprising an elongated horizontal cylindrical drum, means for rotating the drum, front and rear header plates closing the drum adjacent its ends, the front header plate being located inwardly from the forward end of the drum, a cover closing the forward end of the drum so as to provide with the front header plate a material-receiving compartment, a feed spout for delivering material to be cooled into the compartment, elevating blades inside the compartment for directing the material into the inlet ends of the muffle tubes during rotation of the drum, a hood enclosing the discharge end of the drum for receiving material spilling from the muffle tubes, a duct passing through the hood and rear header plate for directing cold air into the drum, a blower for forcing air into said duct and an offtake duct extending through the front header plate and cover for conducting said air from the drum, said drum enclosing all of said muffle tubes and forming a common conduit for the air.

13. In an apparatus for the calcining of materials, a rotary drum, a flange plate partially closing one end of the drum, said flange plate being provided with a central opening affording access to the interior of the drum, a stationary cover for closing said opening, means retaining said cover in contact with said flange plate, and a compartment upon said cover overlying a substantial portion thereof and adapted to be connected to a source of air pressure, said compartment being perforated at a multitude of points about its periphery to vent air therefrom in the form of a curtain adjacent the flange plate.

14. In combination with a rotary kiln and a hopper for receiving material discharged from the kiln, an inclined feed spout located below the hopper for delivering material from the hopper and a frame loosely encircling the lower end of the hopper and resting upon the upper end of the feed spout to close the space therebetween while permitting limited lateral and vertical movement of the feed spout.

RICHARD D. CHEESMAN.
RICHARD BERNHARD.

DISCLAIMER 2,218,873.—*Richard D. Cheesman* and *Richard Bernhard*, Allentown, Pa. Tube Cooler. Patent dated October 22, 1940. Disclaimer filed June 23, 1943, by the assignee, *Traylor Engineering & Manufacturing Company*.
Hereby enters this disclaimer to claim 4 of said patent.
[*Official Gazette July 13, 1943.*]